United States Patent
Johnsen et al.

(10) Patent No.: US 7,362,764 B2
(45) Date of Patent: Apr. 22, 2008

(54) METHOD AND APPARATUS FOR VERIFYING SERVICE LEVEL IN A COMMUNICATIONS NETWORK

(75) Inventors: Bjorn Dag Johnsen, Oslo (NO); Christopher Jackson, Westford, MA (US); David Brean, Boston, MA (US); Ola Tørudbakken, Oslo (NO)

(73) Assignee: Sun Microsystems, Inc., Santa Clara, CA (US)

( * ) Notice: Subject to any disclaimer, the term of this patent is extended or adjusted under 35 U.S.C. 154(b) by 728 days.

(21) Appl. No.: 10/863,019

(22) Filed: Jun. 8, 2004

(65) Prior Publication Data
US 2005/0271074 A1 Dec. 8, 2005

(51) Int. Cl.
*H04L 12/28* (2006.01)
(52) U.S. Cl. ............................ 370/395.21; 370/428
(58) Field of Classification Search ................ 370/238, 370/252, 392, 231; 710/316
See application file for complete search history.

(56) References Cited

U.S. PATENT DOCUMENTS

| | | | | |
|---|---|---|---|---|
| 4,551,833 A | * | 11/1985 | Turner | 370/236 |
| 6,839,794 B1 | * | 1/2005 | Schober | 710/316 |
| 6,898,752 B2 | * | 5/2005 | Tucker | 714/752 |
| 6,922,749 B1 | * | 7/2005 | Gil et al. | 710/316 |
| 7,124,241 B1 | * | 10/2006 | Reeve et al. | 711/110 |
| 2002/0057699 A1 | * | 5/2002 | Roberts | |
| 2002/0181455 A1 | * | 12/2002 | Norman | |
| 2004/0120254 A1 | * | 6/2004 | Rider | 370/231 |

* cited by examiner

*Primary Examiner*—Edan Orgad
*Assistant Examiner*—Lawrence J Burrowes
(74) *Attorney, Agent, or Firm*—Park, Vaughan & Fleming, LLP

(57) ABSTRACT

One embodiment of the invention provides apparatus and a method for handling an incoming packet at a port in a network. The port belongs to one or more partitions, and at least one service level is associated with each of the partitions. When a packet is received at the port, a partition key and a service level are extracted from the packet. The extracted partition key is used to determine the partition to which the received packet belongs. The service level extracted from the packet is then compared against the service level(s) associated with the determined partition in order to authenticate the packet. In another embodiment, the service level is correlated against a destination identifier from the packet instead of the partition key.

13 Claims, 11 Drawing Sheets

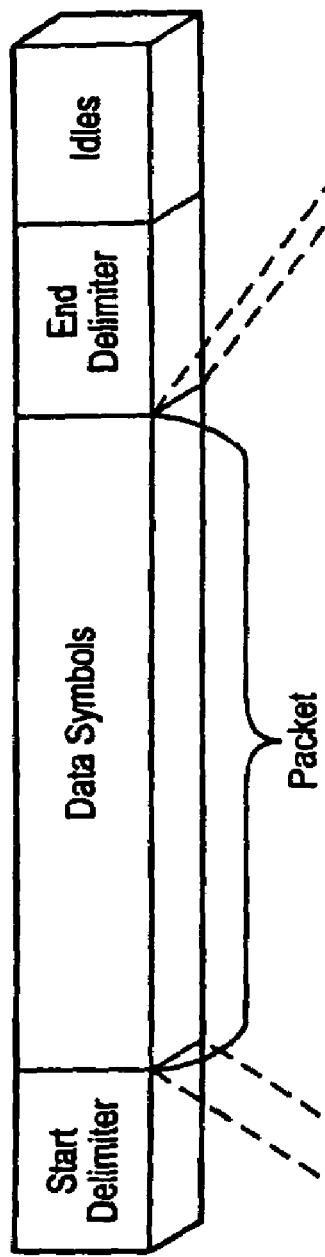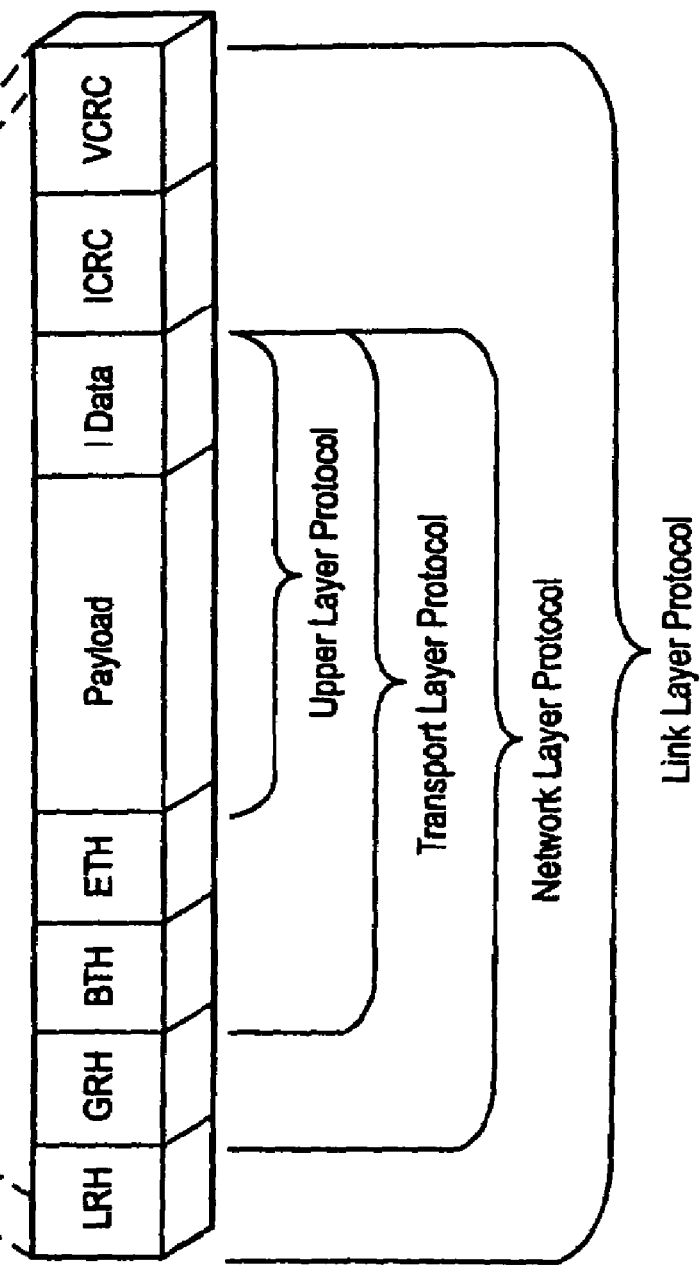

METHOD AND APPARATUS FOR VERIFYING SERVICE LEVEL IN A COMMUNICATIONS NETWORK

RELATED APPLICATIONS

The present application is related to the following applications, all of which are filed on the same day and assigned to the same assignee as the present application:

"SWITCH METHOD AND APPARATUS WITH CUT-THROUGH ROUTING FOR USE IN A COMMUNICATIONS NETWORK" Ser. No. 10/863,016, Inventors: Bjorn Dag Johnsen, Hans Rygh and Morten Schanke;

"SWITCHING METHOD AND APPARATUS FOR USE IN A COMMUNICATIONS NETWORK" Ser. No. 10/862,970, Inventors: Bjorn Dag Johnsen, Christopher Jackson, David Brean, Ola Torudbakken, Steinar Forsmo, Hans Rygh, Morten Schanke;

"METHOD AND APPARATUS FOR SOURCE AUTHENTICATION IN A COMMUNICATIONS NETWORK" Ser. No. 10/863,854, Inventors: Bjorn Dag Johnsen, Christopher Jackson, David Brean, Ola Torudbakken;

"CREDIT ANNOUNCEMENT" Ser. No. 10/863,373, Inventors: Morten Schanke, Hans Rygh, Marius Hansen and Mathias Hoddevik;

"ADAPTIVE CUT-THROUGH ALGORITHM" Ser. No. 10/862,987, Inventors: Morten Schanke, Brian Manula and Magne Sandven;

"COMMA DETECTION" Ser. No. 10/863,374, Inventors: Magne Sandven, Morten Schanke and Brian Manula;

"SERVICE LEVEL TO VIRTUAL LANE MAPPING" Ser. No. 10/862,985, Inventors: Steinar Forsmo, Hans Rygh and Ola Torudbakken;

"INPUT AND OUTPUT BUFFERING" Ser. No. 10/863,038, Inventors: Hans Rygh, Morten Schanke, Ola Torudbakken and Steinar Forsmo;

"CODEC IMPLEMENTATION FOR INFINIBAND" Ser. No. 10/863,439, Inventors: Steinar Forsmo, Mathias Hoddevik and Magne Sandven;

"VCRC CHECKING AND GENERATION" Ser. No. 10/863,013, Inventors: Steinar Forsmo, Hans Rygh, Morten Schanke and Ola Torudbakken;

"COMMUNITY SEPARATION ENFORCEMENT" Ser. No. 10/863,544, Inventors: Ola Torudbakken and Bjorn Dag Johnsen;

"STUMPING MECHANISM" Ser. No. 10/863,372, Inventors: Brian Manula, Ali Bozkaya and Magne Sandven.

The above-identified applications are all hereby incorporated by reference into the present application.

FIELD OF THE INVENTION

The present invention relates to communications networks, and in particular to the authentication of packets travelling over such networks.

BACKGROUND OF THE INVENTION

The security of data communications networks is become increasingly important. As more and more sensitive data is transmitted over such networks, it is very important that data belonging to one user on the network does not somehow become exposed or visible to another user on the network. In addition, as organisations place ever greater reliance on the availability of networks for conducting their business and other operations, a network must be robust against hardware and software errors, component down-time, abnormal traffic conditions, and so on.

Some network problems may be innocent (i.e. non-malicious) in origin. For example, they may be caused by a hardware failure, a software bug, or some other weakness. In other cases, an adversary may try to cause network problems deliberately with malicious intent, such as for motives of terrorism, commercial gain, political persuasion, etc. Depending upon the motives of the attack, the particular objective may be to obtain inappropriate access to data communications over the network, or to induce non-availability or some other non-functioning of the network. A malicious attack may exploit a known weakness in the network, and/or the attack may attempt to generate problems by the deliberate injection of errors, anomalous traffic, and so on.

It is therefore important for a network to be reliable and secure, and to be as resistant as possible against problems, whether deliberate or otherwise.

SUMMARY OF THE INVENTION

Accordingly, one embodiment of the invention provides a method of handling an incoming packet at a port in a network. The method involves associating at least one service level with a partition to which the port belongs, and then receiving a packet at the port. Information about the service level(s) is extracted from the received packet and verified against the service level(s) associated with the partition. This helps to ensure that packets having unauthorised service levels are not able to progress across the network. (Note that sending an unauthorised or incorrect service level could allow a node to gain access to network characteristics, such as improved latency or bandwidth, to which the node is not properly entitled).

In one embodiment, a port belongs to multiple partitions, each having at least one service level associated therewith. The method further comprises identifying to which partition the received packet belongs (based on a partition key extracted from the received packet), and determining the service level(s) associated with the identified partition. The verifying of the extracted service level can then be performed against the service level(s) associated with the identified partition.

In one embodiment the extracted partition key is used to access a partition key table to confirm that the received packet belongs to a partition to which the port belongs. In addition, the partition key table is used identify the service level(s) associated with the partition to which the received packet belongs. The partition key table may be stored in content addressable memory (CAM).

Another embodiment of the invention provides a method of handling an incoming packet at a port in a network. The method comprises associating at least one service level with a destination identifier and then receiving a packet at the port. A service level and a destination identifier are extracted from the received packet. The extracted service level is verified against the service level(s) associated with a destination identifier corresponding to the extracted destination identifier.

Another embodiment of the invention provides a communications node for use in a network, the communications node including at least one port comprising memory storing information identifying at least one service level associated with a partition to which the port belongs; an input for receiving a packet at the port; and logic for extracting a service level from the received packet and for verifying the extracted service level against the service level(s) associated with the partition.

It will be appreciated that the communications node embodiment of the invention will generally benefit from the same particular features as the method embodiment of the invention described above.

BRIEF DESCRIPTION OF THE DRAWINGS

Specific embodiments of the present invention will now be described by way of example only with reference to the accompanying figures in which:

FIG. 6 shows schematically the structure of a message to be transmitted via an InfiniBand Architecture system.

FIG. 7 shows schematically the format of a packet of the message of FIG. 6.

DETAILED DESCRIPTION

1) The InfiniBand Architecture

The InfiniBand architecture provides a standard computer networking environment defined and administered by the InfiniBand Trade Association, which was founded by Compaq, Dell, Hewlett-Packard, IBM, Intel, Microsoft and Sun Microsystems (InfiniBand is a trademark of the InfiniBand Trade Association; other names are trademarks of their respective companies). The InfiniBand Architecture defines a System Area Network (SAN) for connecting multiple independent processor platforms (i.e. host processor nodes), I/O platforms and I/O devices. A full definition of the InfiniBand Architecture may be found in the InfiniBand Architecture Specification Volumes 1 and 2, available from the InfiniBand Trade Association (www.InfiniBandta.org), and which is hereby incorporated hereinto by reference.

An InfiniBand Architecture system area network (SAN) provides a communications and management infrastructure supporting both I/O and interprocessor communications for one or more computer systems. An InfiniBand Architecture system can range from a small server with one processor and a few I/O devices to a massively parallel supercomputer installation with hundreds of processors and thousands of I/O devices.

The InfiniBand Architecture defines a switched communications fabric allowing many devices to communicate concurrently with high bandwidth and low latency in a protected, remotely managed environment. An end node can communicate over multiple InfiniBand Architecture ports and can utilise multiple paths through the InfiniBand Architecture fabric. A multiplicity of InfiniBand Architecture ports and paths through the network are provided both for fault tolerance and for increased data transfer bandwidth.

Figure 1:
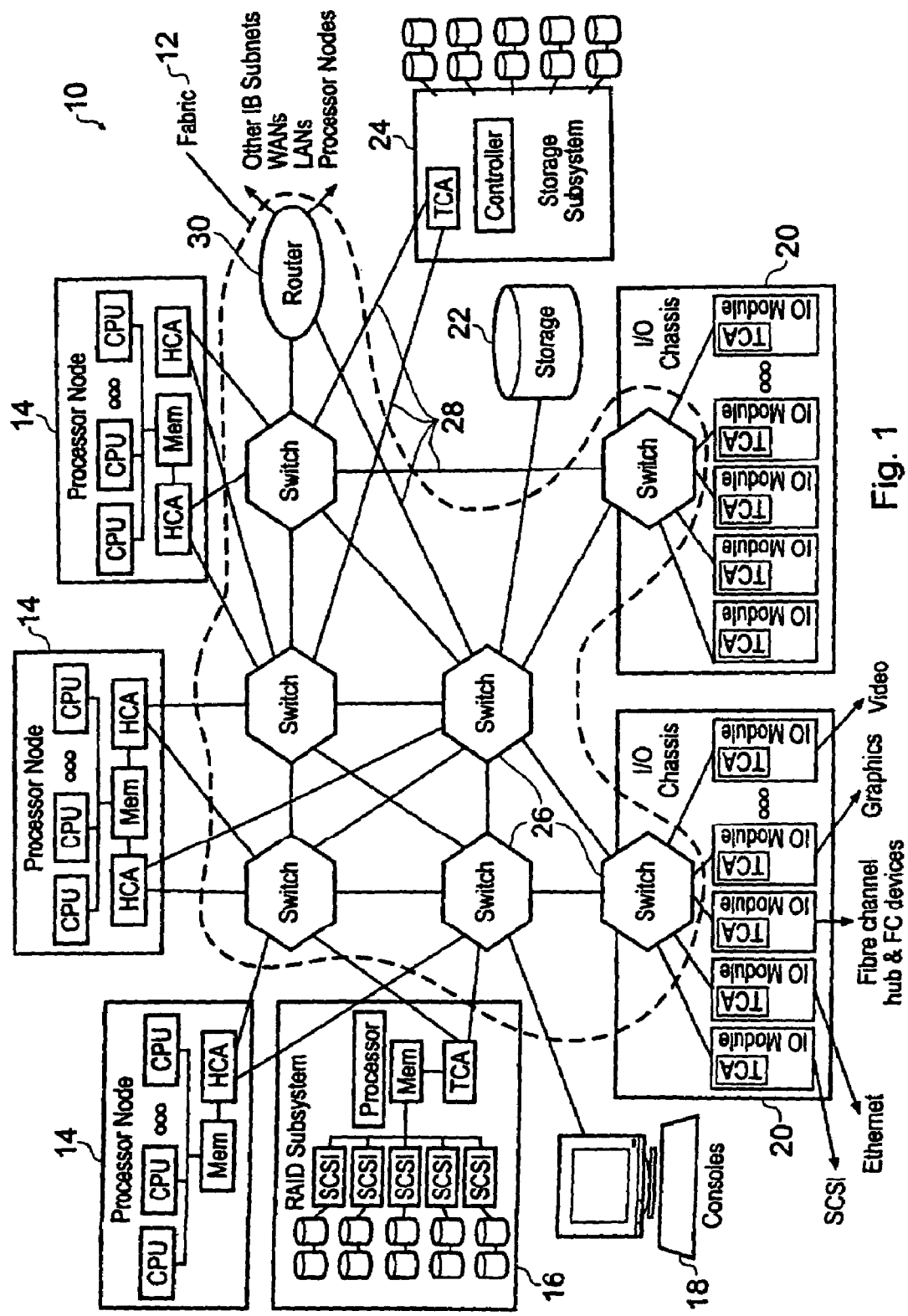
FIG. 1 is a schematic block diagram showing an example of interconnection of computing system elements via the InfiniBand networking architecture.

An example of an InfiniBand Architecture system area network is shown in FIG. 1. As can be seen from FIG. 1, the system area network 10 comprises an InfiniBand Architecture fabric (or subnet) 12 made up of cascaded switches and routers. The fabric 12 provides links between a number of processor nodes 14 and other nodes including a RAID subsystem 16, consoles 18, I/O chassis 20, storage 22 and a storage subsystem 24. The fabric 12 comprises a plurality of switches 26 with InfiniBand links 28 providing data connections between the switches 26 and between the nodes attached to the fabric 12. Also included in the fabric 12 is a router 30 for providing connections to and from other networks, which may be other InfiniBand Architecture subnets, non-InfiniBand Architecture LANs and WANs, and/or processor nodes. I/O units connected via the fabric 12 may range in complexity from single ASIC devices such as a SCSI (small computer systems interface) or LAN adapter to large memory rich RAID subsystems that rival a processor node in complexity. Collectively, the processor nodes 14, RAID subsystem 16, consoles 18, I/O chassis 20, storage 22 and storage subsystems 24 are known as end nodes 32.

Each end-node 32 includes a channel adapter, which may be a Host Channel Adapter (HCA) or a Target Channel Adapter (TCA). Host Channel Adapters are found in processor nodes 14, and Target Channel Adapters are found in I/O nodes 16, 18, 20, 22 and 24. Host Channel Adapters are configured to issue requests across the fabric 12, and Target Channel Adapters are configured to respond to such requests, for example by supplying requested data or storing supplied data.

Each channel adapter uses a queuing system based on Queue Pairs, one queue for send operations and one for receive operations. Each queue pair may therefore be considered to provide a virtual communication port for a channel adapter. Each channel adapter may have up to $2^{24}$ Queue Pairs, which may be assigned individually or in combination to handle communications involving different parts (or consumers) of the end node 32. For example, a processor node 16 may comprise a plurality of processors and each processor may have one or more individual Queue Pairs assigned to handle requests and responses flowing to and from that particular processor of the processor node via fabric 12. Alternatively, or in addition, a processor of a given processor node 16 may be running more than one process and each process may have one or more Queue Pairs assigned to handle requests and responses flowing to and from that process via the fabric 12.

The interconnects 28 may be one of three classes, 1x, 4x or 12x, referring to the number of parallel lanes making up that interconnect. Each lane is a single serial connection over a single physical signal carrier path (whether electrical or optical). Thus the bandwidth available to each interconnect is defined by a combination of the number of lanes and the maximum data rate of the physical signal carrier making up each lane.

Figure 2:
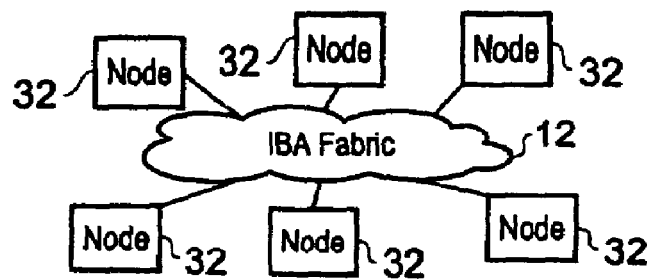
FIG. 2 is a schematic block diagram of a simplified arrangement of an InfiniBand Architecture system.
Figure 3:
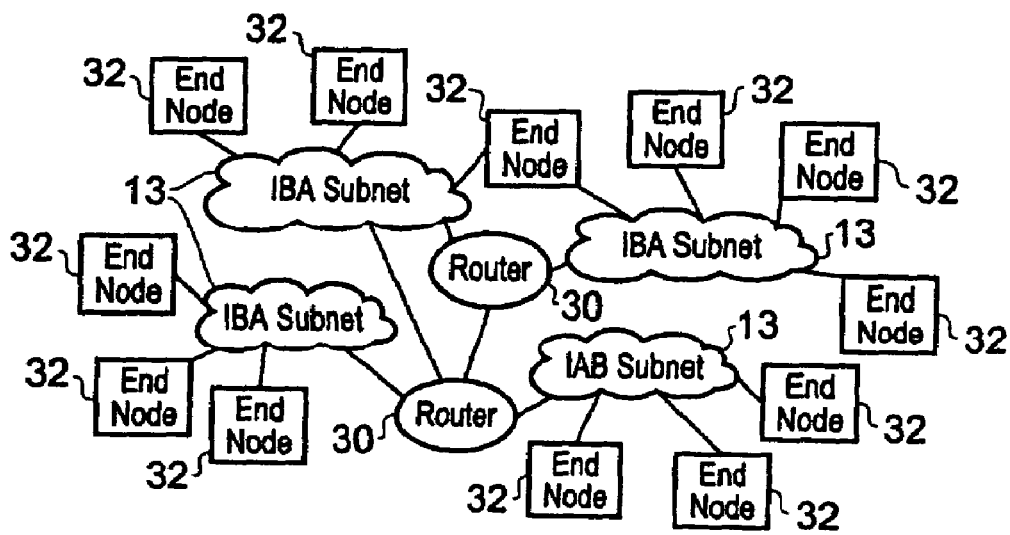
FIG. 3 is a schematic block diagram of another simplified arrangement of an InfiniBand Architecture system.
Figure 4:
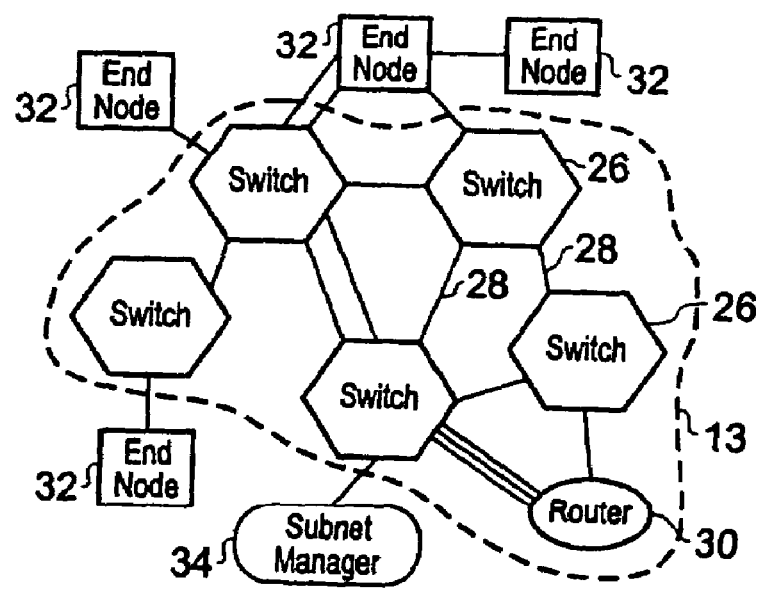
FIG. 4 is a schematic block diagram of a further simplified arrangement of an InfiniBand Architecture system.

Examples of possible InfiniBand Architecture topologies are shown in FIGS. 2, 3 and 4. FIG. 2 shows a high level simplified topology example where a number of end nodes 32 are interconnected by the fabric 12. An InfiniBand Architecture network may be subdivided into subnets 13 interconnected by routers 30 as illustrated in FIG. 3. Any particular end node 32 may be attached to a single subnet 13 or to multiple subnets 13. Shown in FIG. 4 is an example of the structure of a subnet 13. The subnet 13 comprises end nodes 32, switches 26, routers 30 and subnet managers 34 interconnected by links 28. Each end node 32 may attach to a single switch 26, multiple switches 26 and/or directly with each other. In the case of a direct connection between end nodes 32, the two or more directly linked end nodes form in effect an independent subnet with no connectivity to the remainder of the devices attached to the main subnet, and one of the interconnected end nodes functions as the subnet manager for that link.

Figure 5:
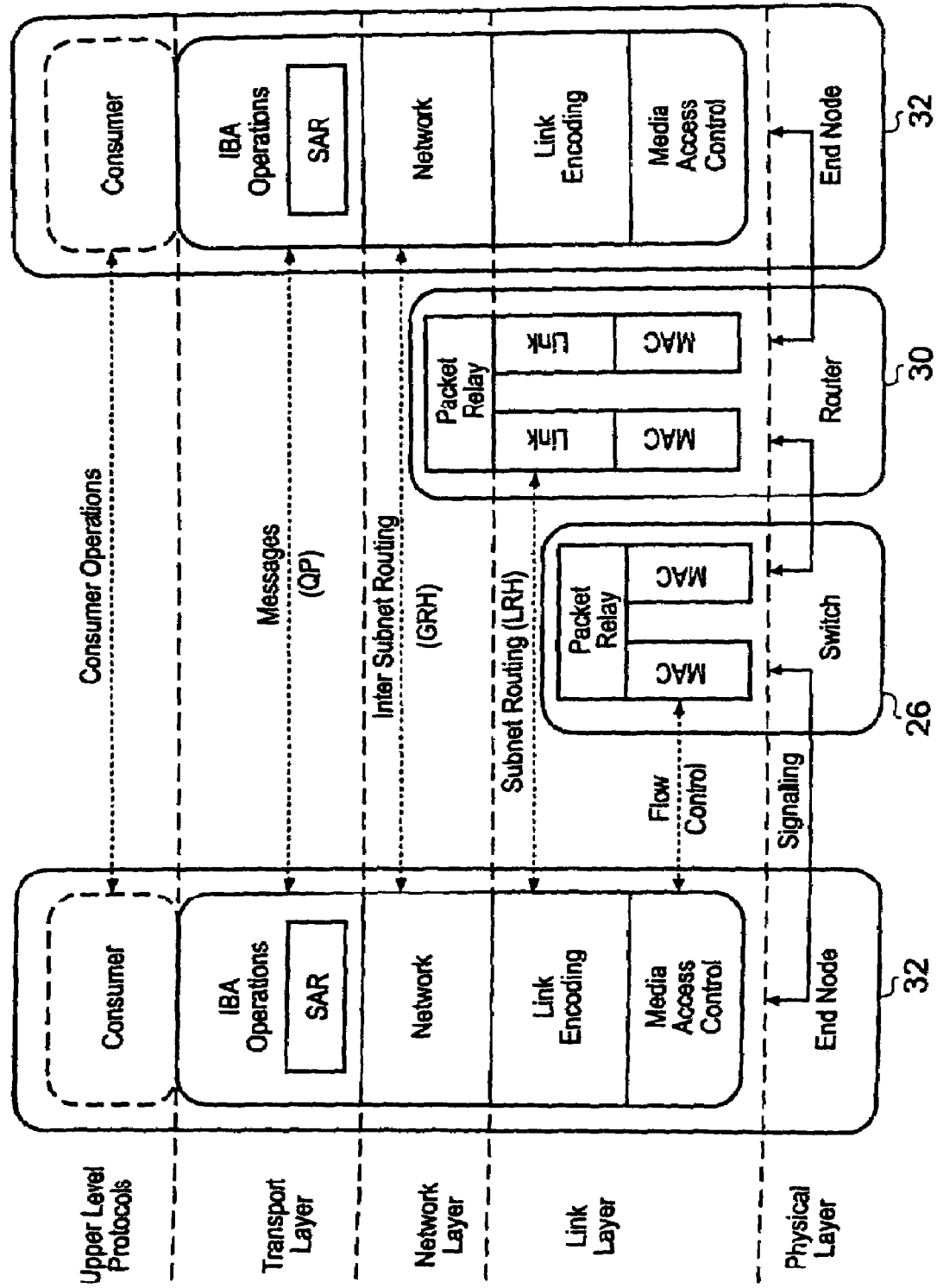
FIG. 5 is a schematic illustration of the layers of an InfiniBand Architecture system.

Referring now to FIG. 5, there is shown an illustration of the architecture layers of an InfiniBand Architecture system. Starting with the physical layer, this specifies how bits are placed onto the interconnections 28 and defines the symbols used for framing (i.e. start of packet and end of packet), data, and fill between packets (idles). It also specifies the signalling protocol as to what constitutes a validly formed packet (i.e. symbol encoding, proper alignment of framing symbols, no invalid or non-data symbols between start and end delimiters, no disparity errors, synchronisation method, etc.). The signalling protocol used by the InfiniBand Architecture utilises a differential signal. The interconnects 28 between nodes of an InfiniBand Architecture network are normally provided by electrical signal carriers such as copper cables or optical signal carriers such as optical fibres. As discussed above, the maximum data rate of the interconnect is limited by the bandwidth of the selected channel. The physical layer also includes de-skewing circuitry for compensating for skew latency in the channels.

The structure of a message to be transmitted through the fabric 12 via the interconnections 28 is illustrated in FIG. 6. As can be seen from FIG. 6, the message comprises a start delimiter, a packet comprising data symbols, an end delimiter and a number of idles.

The data packet format is illustrated in FIG. 7. Packets may be one of two types, IBA (InfiniBand Architecture) Packets or RAW (non InfiniBand Architecture) Packets. IBA Packets have IBA defined transport headers, are routed on InfiniBand Architecture fabrics 12, and use native InfiniBand Architecture transport facilities. Raw Packets may be routed on IBA fabrics but do not contain InfiniBand Architecture transport headers. From an InfiniBand point of view, these packets contain only InfiniBand routing headers, payload and CRC. The InfiniBand Architecture does not define the processing of these packets above the link and network layers. These packets can be used to support non-InfiniBand Architecture transports (e.g. TCP/IP, IPX/SPX, NetBUI etc) over an InfiniBand fabric.

The link layer describes the packet format and protocols for packet operation, e.g. flow control and how packets are routed within a subnet between the source and the destination. Packets may be data packets that convey data between end nodes and comprise a number of different headers which may or may not be present. Alternatively, packets may be Link Management Packets, which are used to train and maintain link operation. These packets are used to negotiate operational parameters between the ports at each end of a link such as bit rate, link width etc. The link layer is responsible for flow control handling to prevent the loss of packets due to buffer overflow by the receiver at each end of a link. This mechanism does not describe end to end flow control such as might be utilised to prevent transmission of messages during periods when receive buffers are not posted. The terms "transmitter" and "receiver" are utilised to describe each end of a given link. The transmitter is the node sourcing data packets. The receiver is the consumer of the data packets. Each end of the link has a transmitter and a receiver. The InfiniBand Architecture utilises an "absolute" credit based flow control scheme, in which InfiniBand Architecture receivers provide a "credit limit". A credit limit is an indication of the total amount of data that a transmitter has been authorised to send since link initialisation.

Credit control is performed by a media access control (MAC) protocol. With respect to a given link, a receiver advertises (by means of a link packet) that credit is available, the amount of which is based on the current status of the receiver's receive buffers. The transmitter receives the link packet and determines how much transmit credit is available from the contents of the link packet. The transmitter then assigns itself the available credit and transmits data packets to the receiver while simultaneously decrementing its available credit count. The transmitter calculates its remaining available credit based on the initial figure determined from the receiver link packet and a record of how much data it has transmitted since that link packet was received.

Errors in transmission, in data packets, or in the exchange of flow control information can result in inconsistencies in the flow control state perceived by the transmitter and receiver. The InfiniBand Architecture flow control mechanism provides for recovery from this condition. The transmitter periodically sends an indication of the total amount of data that it has sent since link initialisation. The receiver uses this data to re-synchronise the state between the receiver and transmitter.

As can be seen in FIG. 7, the link layer adds a Local Route Header (LRH) to the front of the packet and adds Invariant and Variant Cyclic Redundancy Checks (ICRC and VCRC) to the end of the packet. The Local Route Header is always present and identifies the local source and local destination where switches 26 will route the packet. The Invariant Cyclic Redundancy Check covers all fields within the packet which do not change as the message traverses the fabric. The Variant Cyclic Redundancy Check covers all the fields of the packet. The combination of the two CRCs allows switches 26 and routers 30 to modify appropriate fields and still maintain data integrity for the transport control and data portion of the packet.

The network layer, which is present only within routers 30 and end nodes 32, describes the protocol for routing a packet between subnets 13. Thus a Global Route Header (GRH) is present in a packet that traverses multiple subnets 13. The Global Route Header identifies the source and destination ports of the message. Routers 30 use the contents of the Global Route Header to determine the forwarding requirements of the message. As the message traverses different subnets 13 the routers 30 modify the content of the Global Route Header and replace the Local Route Header but the source and destination port identities are not changed and are protected by the Invariant Cyclic Redundancy Check. Thus the network and link layers operate together to deliver a packet to the desired destination.

The transport layer, which is present only within end nodes 32, delivers the packet to the proper Queue Pair within the channel adapter of the destination end node 32 and instructs that Queue Pair as to how the packet's data should be processed. The transport layer also has responsibility for segmenting a message into multiple packets when the message's data payload is greater than the maximum payload that can be carried by a single packet. The receiving Queue Pair then reassembles the data from the multiple packets at the destination end node 32. The transport layer adds up to two headers to the packet. The Base Transport Header (BTH) is present in all IBA Packets but not in RAW Packets. It identifies the destination Queue Pair and indicates an operation code, packet sequence number and specifies the operation (Send, Read, Write etc). A number of Extended Transport Headers (ETH) may be present conditional on the class of service and operation code.

The Packet Sequence Number is initialised for a given Queue Pair as part of the communications establishment process and increments each time that Queue Pair creates a new packet. The receiving Queue Pair tracks the received Packet Sequence Number to determine whether any packets have been lost. For reliable service, the receiver end node 32 may transmit an acknowledgement back to the originator end node to indicate whether all packets have been received successfully.

The upper level protocols are completely software based and may comprise any number of protocols used by various user consumers. The payload is the data carried by the packet and I Data is handling data associated with a work activity to be performed on the payload. Also present in the upper level protocols are Subnet Management and Subnet Services protocols. These protocols provide management structure including management messages for management of the subnet 13. Each subnet 13 requires only a single Subnet Manager application 34 which may be present in a dedicated node (as illustrated in FIG. 4) or may reside in another node, including a switch 26 or a router 30 as well as an end node 32.

Figure 8:
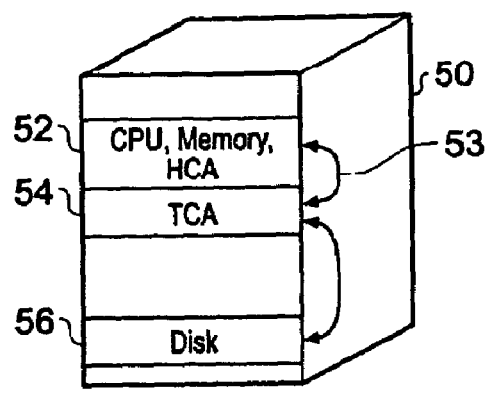
FIG. 8 is a schematic block diagram showing an arrangement where the InfiniBand Architecture is used to interconnect components within a computer system.
Figure 9:
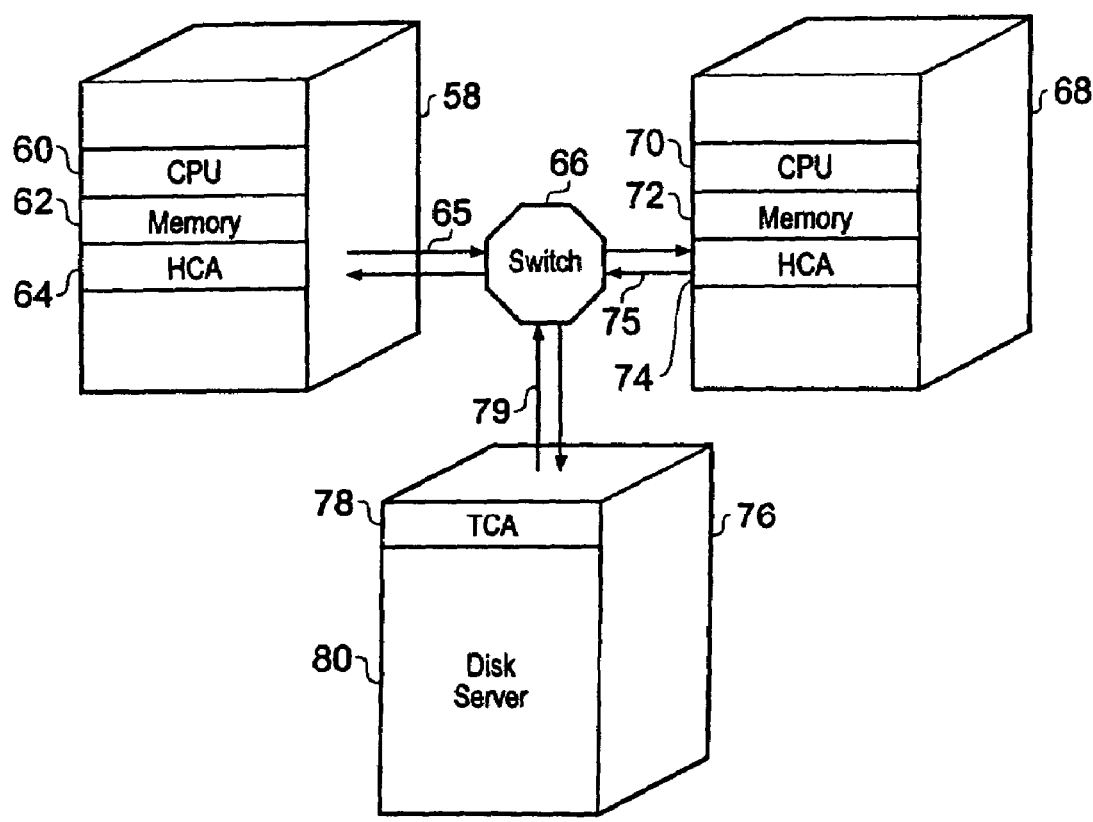
FIG. 9 is a schematic block diagram showing an arrangement where the InfiniBand Architecture is used as an interconnect between computer systems.

Examples of simple InfiniBand Architecture systems are shown in FIGS. 8 and 9. FIG. 8 shows an arrangement where the InfiniBand Architecture is used to interconnect components within a standard computer system rack 50. In this example, the CPU, memory and a Host Channel Adapter 52 are interconnected using conventional non-InfiniBand Architecture techniques. The Host Channel Adapter 52 of the CPU and memory communicate via an InfiniBand Architecture interconnect 53 with a Target Channel Adapter 54. The Target Channel Adapter 54 communicates with a disk drive unit 56 via a SCSI (Small Computer System Interface) connection. Thus the InfiniBand Architecture is configured in this example to facilitate communications between elements of the same computer system.

FIG. 9 shows an arrangement where the InfiniBand Architecture is used only as an interconnect between computers. In this example a first computer system is mounted in a rack 58 and comprises a CPU 60, memory 62 and a Host Channel Adapter 64 interconnected via non-InfiniBand Architecture techniques. Via the Host Channel adapter 64, the first computer system communicates to and from a switch 66 across interconnects 65. Also connected to the switch 66 is a second computer system mounted in a rack 68 and comprising a CPU 70, memory 72 and a Host Channel Adapter 74, which connects to the switch 66 via interconnects 75. Data storage for the first and second computer systems is provided by a disk server 80 mounted in a rack 76. The disk server 80 connects with a Target Channel Adapter 78 also mounted within the rack 76 by non-InfiniBand Architecture techniques. The Target Channel Adapter 78 connects to the switch 66 via interconnects 79. Thus the InfiniBand Architecture is configured in this example to facilitate communication between more than one distinct computer system. The techniques shown in FIGS. 8 and 9 may be employed in combination with one another, for example a computer system using the InfiniBand Architecture for internal communications may also be connected to other computer systems via a network based on the InfiniBand Architecture.

Figure 10:
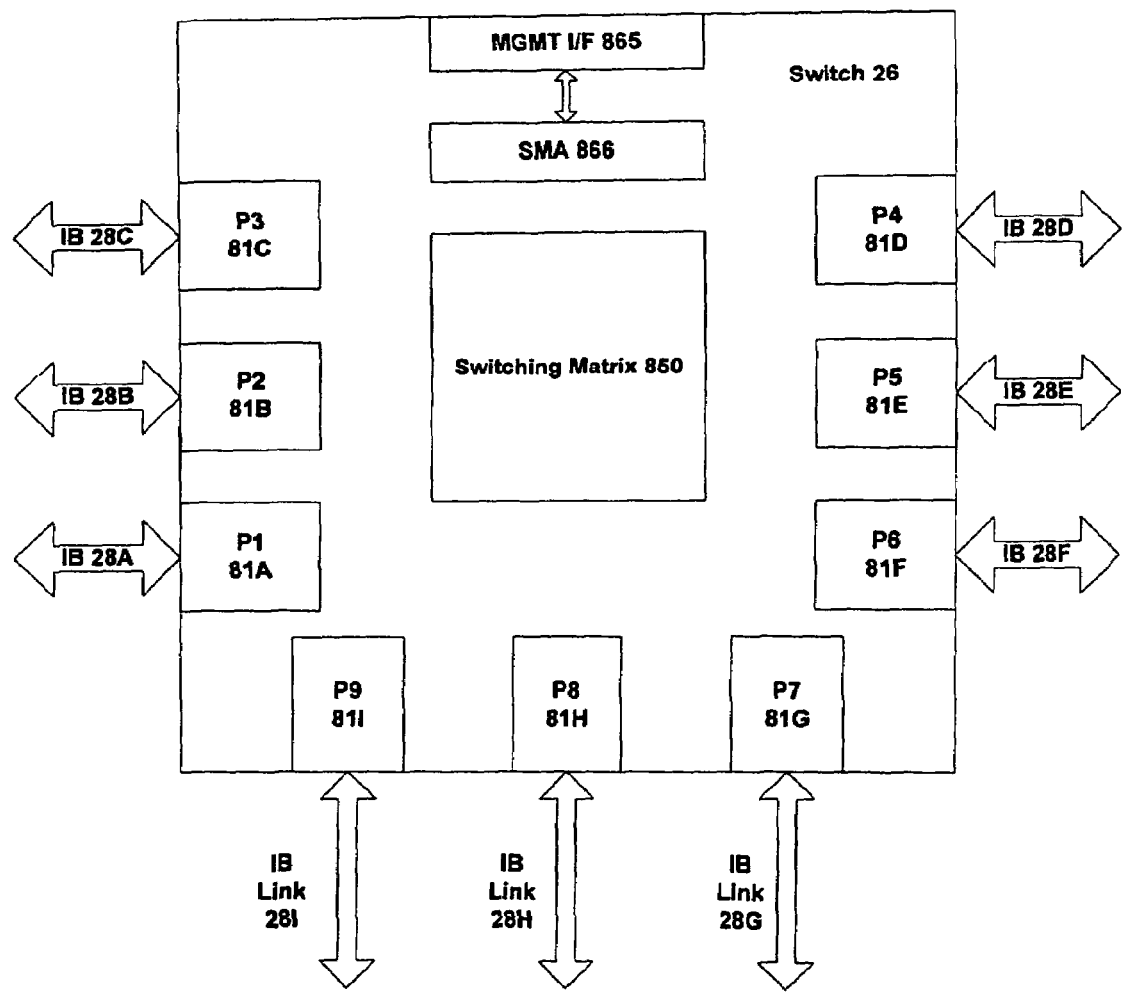
FIG. 10 is a schematic block diagram showing a switch for use in an InfiniBand network in accordance with one embodiment of the invention.

FIG. 10 illustrates a switch 26 for use in fabric 12 in accordance with one embodiment of the invention. Switch 26 is implemented as a semiconductor device, for example an application specific integrated circuit (ASIC), and includes a management control interface 865, a subnet management agent (SMA) 866, multiple ports 81, and a switching matrix 850.

The management interface 865 provides access to the switch 26 for one or more external control systems, and can be used to configure switch 26 as appropriate depending upon the circumstances. For example, the subnet management agent 866 can communicate with the subnet manager 34 (see FIG. 4) via management interface 865.

In the embodiment illustrated in FIG. 10, switch 26 has nine ports 81, denoted in FIG. 10 as P1 81A, P2 81B, P3 81C, P4 81D, P5 81E, P6 81F, P7 81G, P8 81H, and P9 81I. Each port is attached to a corresponding InfiniBand duplex link 28 providing transmit (Tx) and receive (Rx) capability, and comprising one, four or twelve physical lanes. Each physical lane provides a basic data rate of 2.5 GHz, so that switch 26 provides connectivity for a total of 96 (9×12) lanes. The physical lanes into any given port are managed as a single logical link, and can be flow controlled using a credit-based link level flow control, as described above.

In accordance with the InfiniBand Architecture, each link 28 can be subdivided into a maximum of sixteen virtual lanes (VL) to provide logically separate channels that are multiplexed onto a single logical link. The first fifteen virtual lanes (denoted VL0 through VL14) support general purpose data communications, while the remaining virtual lane (denoted VL15) is used for special management purposes. (Note that virtual lane VL15 is not flow-controlled, and so should be considered as not reliable). An InfiniBand switch must support at least two virtual lanes on each link (i.e. data lane VL0 and management lane VL15). In one particular embodiment, switch 26 supports four virtual lanes for general data communication plus one virtual lane for management purposes (VL15).

In accordance with the InfiniBand Architecture, a packet can be specified as having one of sixteen different service levels (SLs). The service level for a particular packet is specified in the local route header (LRH), and remains constant as the packet transits an InfiniBand subnet. The SL value in the packet determines the virtual lane over which the packet is transmitted across any given link in the subnet. This is achieved by having a switch maintain a set of SL-to-VL mappings (which are specific to each input port/output port combination). The SL-to-VL mappings are initialized and maintained by the subnet manager 34 (see FIG. 4).

On receipt of an incoming packet, a port first determines the output port to forward the packet to, based on the DLID value in the packet (as explained in more detail below). The port then uses the SL-to-VL mappings to decide the virtual lane over which the packet should be sent, given the SL value in the packet and the output port from which the packet will be transmitted. Note that since different switches may support different numbers of virtual lanes, a packet may be assigned to different virtual lanes for different links of its journey across a subnet.

The range of service levels can be used to provide a quality of service (QoS) mechanism in an InfiniBand network. Thus any given virtual lane can be classified as low priority or high priority, and assigned a weight within that classification. The weight and classification of a virtual lane control its access to the bandwidth of the physical link, relative to the other virtual lanes supported over the same link. The service level of a packet then determines the virtual lane utilised by the packet over the link, in accordance with the SL-to-VL mappings. These mappings can be configured to reflect the number of virtual lanes provided by any given link and also the quality of service policy of the network.

The InfiniBand Architecture supports the concept of partitioning in order to provide logical isolation of components sharing the same subnet. All nodes included in a route from a source to a destination must share the same 16-bit partition key (P_Key), otherwise they are unable to communicate with one another (or even to recognise each other's existence). An individual node may support multiple partition keys, and so belong to multiple different partitions.

A member of a partition can be denoted as a full member or a limited (partial) member, dependent on the high-order bit of the partition key. A full member can communicate with either a limited member or a full member, but a limited member cannot communicate with another limited member of that partition (only a full member). This model corresponds to a client-server architecture, where servers are full members and clients are partial members, and clients do not need generally to talk directly to one another.

Each queue pair at an end node has a partition key table which is assigned to it by the subnet manager 34 (see FIG. 4). A queue pair is assigned an index into the partition key table, and can then use this index to obtain and store the appropriate partition key into the local route header (LRH) for each outgoing packet. Conversely, a queue pair receiving a packet checks that the P_Key value within the incoming packet matches the indexed P_Key value in the P_Key table (if not, the incoming packet is discarded).

Each port 81 on switch 26 is provided with an input buffer (not shown in FIG. 10). The input buffer receives data arriving at a port 81 over its respective link 28, and stores this data pending transfer through the switching matrix 850. In the embodiment mentioned above, each input buffer is divided into four sections, corresponding to the four virtual lanes on the associated link 28. This ensures that data from the different virtual lanes is kept properly isolated.

Switching matrix 850 is used to transport data from one port to another. For example, if data arrives on link 28D at port P4 81D and is to be forwarded on link 28A, then switching matrix 850 is responsible for transferring the data from port P4 81D to port P1 81A (corresponding to link 28A). It will be appreciated that while ports 81 are constrained by the InfiniBand standard (in order to ensure network connectivity), to some extent switching matrix 850 can be regarded as a more generic switching device, since it is internal to switch 26 and therefore shielded (at least in part) from other network devices.

The InfiniBand architecture supports two general modes of communication. The first of these is unicast or point-to-point, in which each data packet goes from a single source to a single destination. This translates into switching matrix 850 transferring a packet from one incoming port to one outgoing port. The other mode of communication in InfiniBand is multicast, in which a packet may be routed from a single source to multiple destinations. This is mirrored in the passage of the packet through switching matrix 850, whereby a packet from an incoming port may be directed to multiple outgoing ports.

It is desirable for the switch 26 to have low latency and high efficiency. A low latency implies relatively small amounts of buffering, otherwise delays through the switch will tend to increase. A high efficiency implies that the performance of the switch 26 is not degraded due to competition for resources within the chip as the load (i.e. the traffic through the switch) rises.

As part of the start-up procedure of an InfiniBand network, the subnet manager 34 (see FIG. 4) assigns each end-node port in a subnet a local identifier (LID). Note that the individual ports 81 in switch 26 are not assigned their own LIDs, although an LID is assigned to port 0 of switch 26, which can be regarded as corresponding to management interface 865. (The switch management port, i.e. port 0, is considered an end-node in the InfiniBand network, unlike the other switch ports).

Each LID comprises two portions, a base LID and a number of path bits. The number of path bits in the LID for a given port is determined by the LID mask count (LMC), which is also assigned by the subnet manager 34. Each packet in transit on the subnet contains the LID of the port from which it originated, namely the source LID (SLID), and also the LID for the port to which the packet is going, namely the destination LID (DLID). The SLID and the DLID are incorporated into the local route header (LRH) of the packet.

When a packet is received at its destination, the port checks that the DLID in the packet matches the LID for that port. Note that in this comparison the path bits of the LID are masked out, so that in effect the comparison is made against the base LID for the port. Thus for the purpose of destination checking, the path bits are ignored. However, in terms of routing a packet through a switch, the path bits are taken into consideration. This then allows multiple paths to be specified that all arrive at the same destination port. The ability to provide multiple paths through a subnet to the same destination port aids robustness and reliability within the network.

2) Service Level Verification

The InfiniBand specification generally assumes that the InfiniBand fabric is secure. Hence the main security focus is on controlling which ports can communicate, and what packet traffic can be initiated by end ports in the fabric. This can lead to an exposure to certain problems, whether caused accidentally (e.g. by failed hardware or a software bug) or deliberately (e.g. by a hacker).

For example, existing networks perform only limited checking of the service level (SL) value within a packet. In particular, a port only checks that the SL value in an incoming packet corresponds to a virtual lane (VL) in the SL-to-VL mapping for the outward link on which the packet is to be forwarded. If this is not the case, then the packet is discarded because there is no virtual lane over which it can be forwarded. This check is therefore based solely on the SL-to-VL mappings, and so is dependent only upon the SL value in an incoming packet, the port at which the packet is received into the switch, and the port from which the packet is to be forwarded from the switch.

This level of checking may not be sufficient for averting all network problems. For example, a node may (accidentally or deliberately) assign its outgoing packets an inappropriately high SL value, which causes the network to treat the packets as high priority traffic. As a consequence, the network may suffer a loss of performance with respect to other traffic, including increased delays (latency) and limited capacity (bandwidth).

Accordingly, one embodiment of the invention allows a partition to be assigned one or more permitted SL values. The switch 26 then confirms for each received packet that the SL value in the incoming packet matches or correlates with an SL value permitted for the partition in which that particular packet is being transmitted (as determined by the P_Key value in the packet). If the packet does not have an appropriate SL value, it can be discarded, thereby avoiding disruption to network performance.

Figure 11:
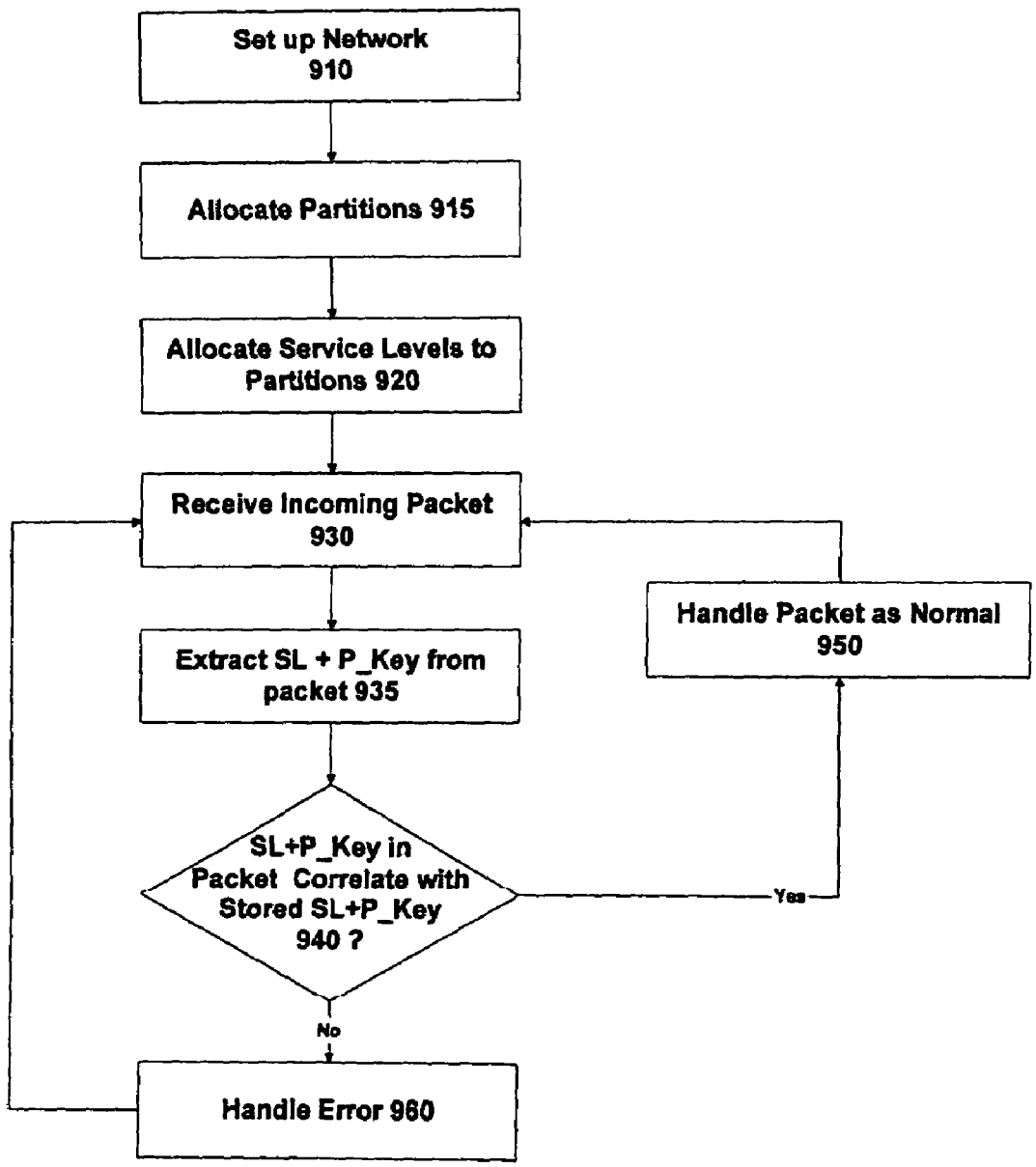
FIG. 11 is a flowchart illustrating a method of checking the service level of an incoming packet in accordance with one embodiment of the invention.

FIG. 11 depicts a flowchart for checking the SL value in a packet in accordance with one embodiment of the invention. The method commences with setting up the network (910), which includes allocating partitions to the port (915). This generally involves populating P_Key tables for the nodes in the network. A P_Key table indicates whether or not a given port is a member of a particular partition, and also whether it is a full member or just a limited member of that partition. It will be appreciated that allocating partitions in this manner is part of existing InfiniBand systems, and so will be familiar to the skilled person.

The method now continues to allocate one or more service levels to the various partitions that have been set up (920). This involves specifying which service level(s) may be used for communications within a given partition. The assignment of service levels in respect of partitions is generally made by a subnet manager 34 (see FIG. 4), based on policy input from the same source as provided policies for assigning the partitions to ports.

It will be appreciated that the InfiniBand specification does not recite any explicit relationship between service level and partition, except that both may be specified for a port (but not in correlation with one another). It is also suggested in the InfiniBand specification that certain service levels are assigned to certain partitions to provide quality of service control. However, this represents a user allocation of resources, rather than an underlying packet authentication approach.

Once the set-up operations 910, 915 and 920 have completed, a port receives an incoming packet (930). The P_Key value and the SL value are extracted from the packet header (935). This then allows the P_Key value to be checked in the P_Key table (as for known implementations) in order to ensure that the incoming packet belongs to an allowed partition. In addition, it is confirmed that the SL value in the packet header is permitted for the partition identified in the packet header (940). In other words, the system checks that the SL value in the packet matches one of the service levels allocated to the partition at operation 920.

If the P_Key and SL values are validated, then the packet is accepted (950) for further processing, i.e. passed to the appropriate output port for the destination node. However, if the validation fails, either because the packet belongs to a partition not supported by the port, or because the packet specifies a service level that is not appropriate to the partition on which the packet is travelling, then an error results (960). In this case, the packet is discarded, and an error may be transmitted to the subnet manager. Note that the exact processing for error handling at operation 960 may vary according to the type of error, namely whether there was a P_Key violation or an SL violation. In one embodiment, the default behaviour for an SL violation is to mirror the behaviour for a P_Key violation (as described in the InfiniBand specification).

It will be appreciated therefore that the approach of FIG. 11 allows the service level (SL) of a packet to be correlated with the partition to which the packet belongs (as determined by its P_Key value). This is to be contrasted with existing systems that perform a validation of the P_Key value, and also of the SL value (to the extent that the SL value maps to an appropriate VL value) but do not perform any correlation between SL and P_Key. The approach of FIG. 11 therefore provides a much greater granularity and sensitivity of control on the usage of service levels within the network, and so is more likely to detect and avert network problems in this regard than existing implementations.

Figure 12:
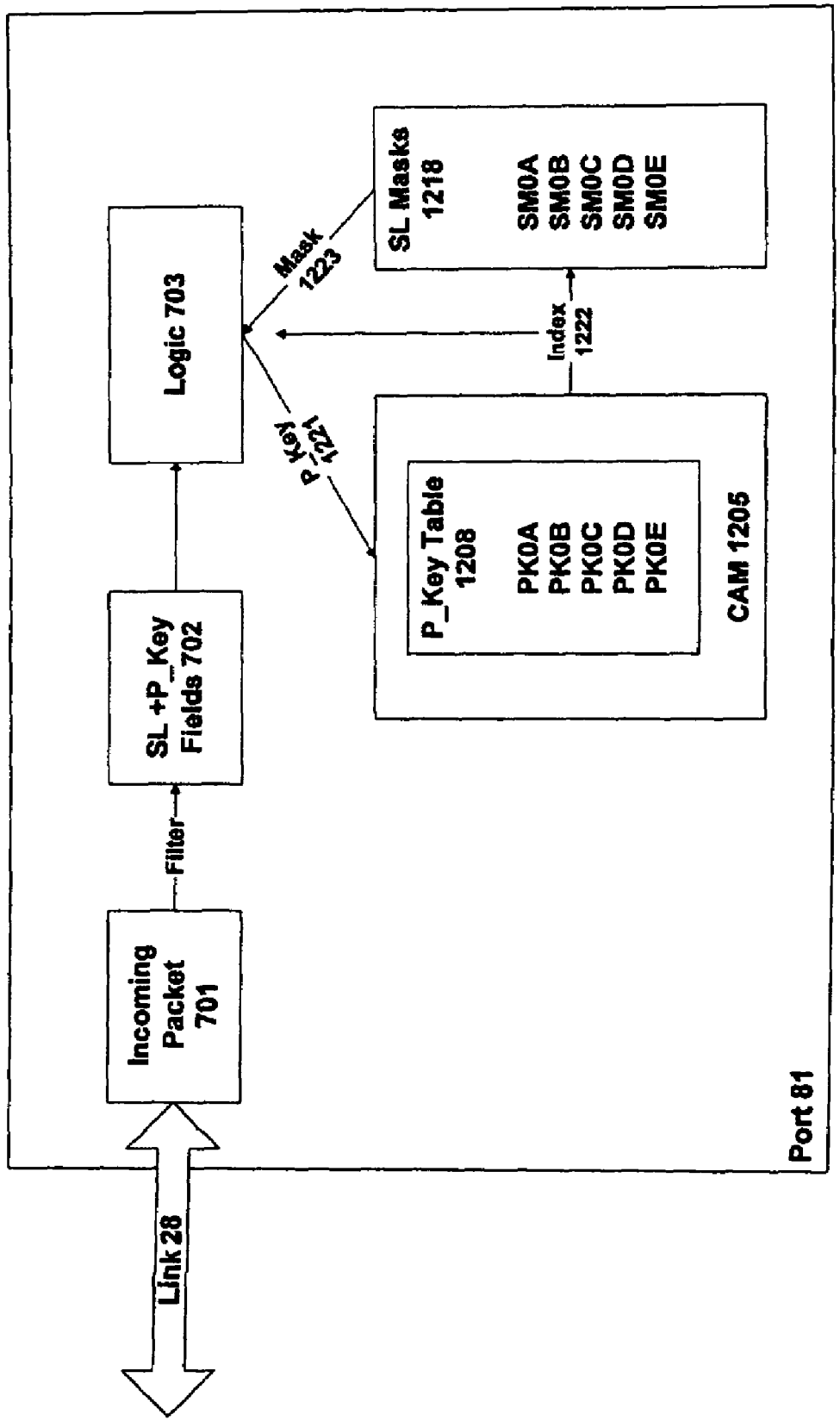
FIG. 12 is a schematic block diagram illustrating a port arranged to check the service level of an incoming packet in accordance with one embodiment of the invention.

FIG. 12 illustrates an implementation of a port 81 to support the processing illustrated in FIG. 11 in accordance with one embodiment of the invention. In the embodiment of FIG. 12, the port receives an incoming packet 701 over link 28. Incoming packet 701 may be stored into a buffer or other component as appropriate. The SL field and the P_Key field 702 are then extracted from the packet header of the incoming packet 701 by an appropriate masking or filtering. Note that in some embodiments, in order to maximise the speed of processing these fields may be extracted (and subsequently tested) before the complete packet itself has arrived at the port 81. This avoids having to wait for the whole packet to arrive before a decision is made as to whether or not the SL field and the P_Key field are correct.

Port 81 further includes a logic unit 703. The logic unit 703 takes the P_Key value extracted from the incoming packet 701 and accesses a content addressable memory (CAM) 1205 on the basis of this P_Key value 1221. The CAM 1205 incorporates a P_Key table 1208, which contains all the partition keys that are valid for that port. For example, in the particular embodiment shown in FIG. 12, port 81 is included in partitions PK0A, PK0B, PK0C, PK0D, and PK0E.

If the received partition key 1221 matches one of the values in the P_Key table 1208, then CAM 1205 detects a hit, implying that the incoming packet 701 belongs to a partition supported by port 81. In this case, the CAM 1205 outputs an index value 1222 representing the location of the matched P_Key value in P_Key table 1208. On the other hand, if no match is found, then the incoming packet 701 does not belong to a partition supported by port 81 and so must be discarded (i.e. corresponding to operation 960 in FIG. 11). This failure may be indicated by the absence of an index signal 1222, or by some predetermined special index value (such as −1). Alternatively, the CAM 1205 may support a specific mechanism (not shown in FIG. 12) to indicate such a failure to logic 703.

Assuming that the P_Key value 1221 from the incoming packet 701 does correspond to a value in the P_Key table 1208, a test is now made to determine whether or not the SL field in the incoming packet 701 is appropriate for the partition to which the incoming packet belongs. In order to make this test, port 81 includes a table of SL masks 1218. The masks are illustrated schematically in FIG. 12 as SM0A, SM0B, SM0C, SM0D, and SM0E.

Note that the position of each mask in table 1218 corresponds with the position of its associated partition in P_Key table 1208. In other words, an SL mask having an index value of N in the SL mask table 1218 corresponds to the partition having a partition key with index N in the P_Key table 1208. Consequently, once an index value 1222 for the incoming packet 701 has been determined from P_Key table 1208, this index value can be passed to the SL mask table 1218 in order to locate the SL mask for that particular partition. The relevant SL mask 1223 can then be returned to logic 703 for authentication of the SL value in the incoming packet.

In one embodiment, an SL mask 1222 is implemented as a 16-bit mask. Each bit in the SL mask corresponds to one possible service level, and is used to indicate whether or not that particular service level is supported for the partition associated with the SL mask. For example, a mask bit value of 0 could indicate that the partition does not support this service level, while a value of I could indicate that the partition does support this particular service level. It will be appreciated that this approach for defining an SL mask allows a partition to support any arbitrary combination of service levels.

In one embodiment, a default bit mask is defined that allows a partition to receive any service level. With the above configuration, such a bit mask would contain all 1s. Such a default would then be consistent with existing implementations that did not correlate service level with partition (and so avoid the need for any "mode flag" for subnet managers that were not aware of this feature).

Once logic 703 has received SL mask 1223 for the incoming packet 701 (i.e. the SL mask corresponding to the partition key included in the incoming packet 701), it can use this mask to verify the SL value in the incoming packet 701. In particular, logic 703 can determine the value of the SL field in incoming packet 701, and use this value to access the corresponding bit within SL mask 1218. For example, if the SL value in the packet is 4, then logic 703 can access the bit in position 4 within SL mask 1223. More generally, if the SL value is N, logic 703 accesses the bit in position N within the SL mask. The incoming SL value is then accepted or rejected depending upon the mask setting. For example, if the mask has a value of 0 in the bit position corresponding to the received SL value, then assuming the above polarity, this indicates that the SL value in the received packet is not supported by the partition. Accordingly, an error results, corresponding to operation 960 in FIG. 11. Alternatively, if there is a 1 in the relevant location of the SL mask 1223, then the SL value from the received packet is indeed supported for the partition to which the packet belong. Hence the packet can be processed normally, corresponding to operation 950 in FIG. 11.

Figure 13:
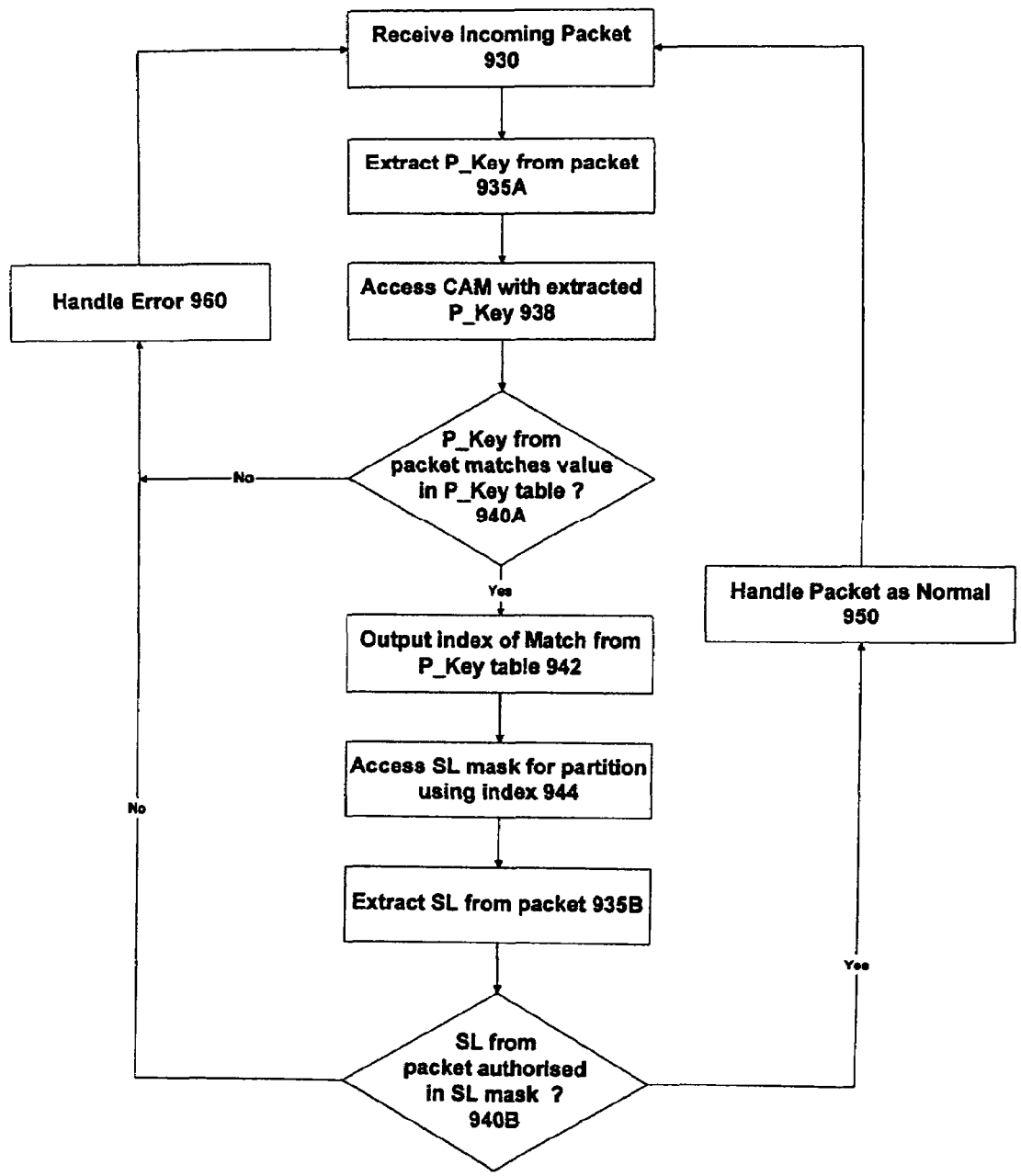
FIG. 13 is a more detailed flowchart illustrating a method of checking the service level of an incoming packet in accordance with one embodiment of the invention.

FIG. 13 is a flowchart showing certain operations from the flowchart of FIG. 11 in more detail, as may be implemented within the embodiment of FIG. 12. Note that for clarity, the set-up operations from FIG. 11 are omitted from FIG. 13. Accordingly, the processing of FIG. 13 commences with receipt of an incoming packet (930). The P_Key value of this packet is extracted (935A) and used to access a CAM containing a P_Key table 1208 (940A). If no match for the extracted P_Key value 1221 is found in the P_Key table 1208, then this represents a partition violation, and consequently an error is flagged (960). (It will be appreciated that P_Key checking per se in accordance with operations 935A, 938, and 940A is performed in existing systems).

If no P_Key violation is found, then we take the positive outcome from operation 940A, leading to the output of index 1222, which represents the partition in the P_Key table 1208 that matched the P_Key value received from the incoming packet (942). This index is then used to access a table 1218 containing the SL bit masks for each partition (944). Using the index value 1222, the particular SL mask 1223 for the partition to which the incoming packet belongs can be identified and retrieved.

The SL value is now extracted from the incoming packet (935B) (unless this has already been done, perhaps at operation 935A, when the P_Key value was extracted). The bit position in the SL mask 1223 corresponding to the extracted SL value is then accessed, and the packet is accepted or rejected in accordance with the setting of the bit in this position. In particular, if the bit has one predetermined value, the SL value is permitted for the partition, and so the packet is allowed to be forwarded as per normal (950). However, if the bit has the opposite value, this indicates that the SL value is not permitted for the partition to which the packet belongs. Accordingly, the packet is rejected, and appropriate error handling is performed (960).

It will be appreciated that the SL mask table 1218 in the embodiment of FIG. 12 has (approximately) the same size as the P_Key table 1208, since both contain one 16 bit value for each partition supported by the port. In some other embodiments, P_Key table 1208 may be implemented using a bit mask having one bit for each potential P_Key value, to indicate whether or not a port is a member of the relevant partition. The size of such a P_Key table would be 8 Kbytes (1 bit for each of 64K possible keys). (This is larger than the size of P_Key table in FIG. 12, since the number of partitions supported by any given port is likely to be only a small proportion of the total number of possible partitions, but it does avoid the use of content addressable memory, which may be desirable for design reasons).

In such an embodiment having a P_Key table in the form of a bit mask, service level can be correlated with partition by again associating an SL bit mask with each partition. Note however, this would significantly increase the size of the P_Key table in order to accommodate a 16-bit SL mask for each partition key (or require storage of a separate SL mask table of this size).

Figure 14:
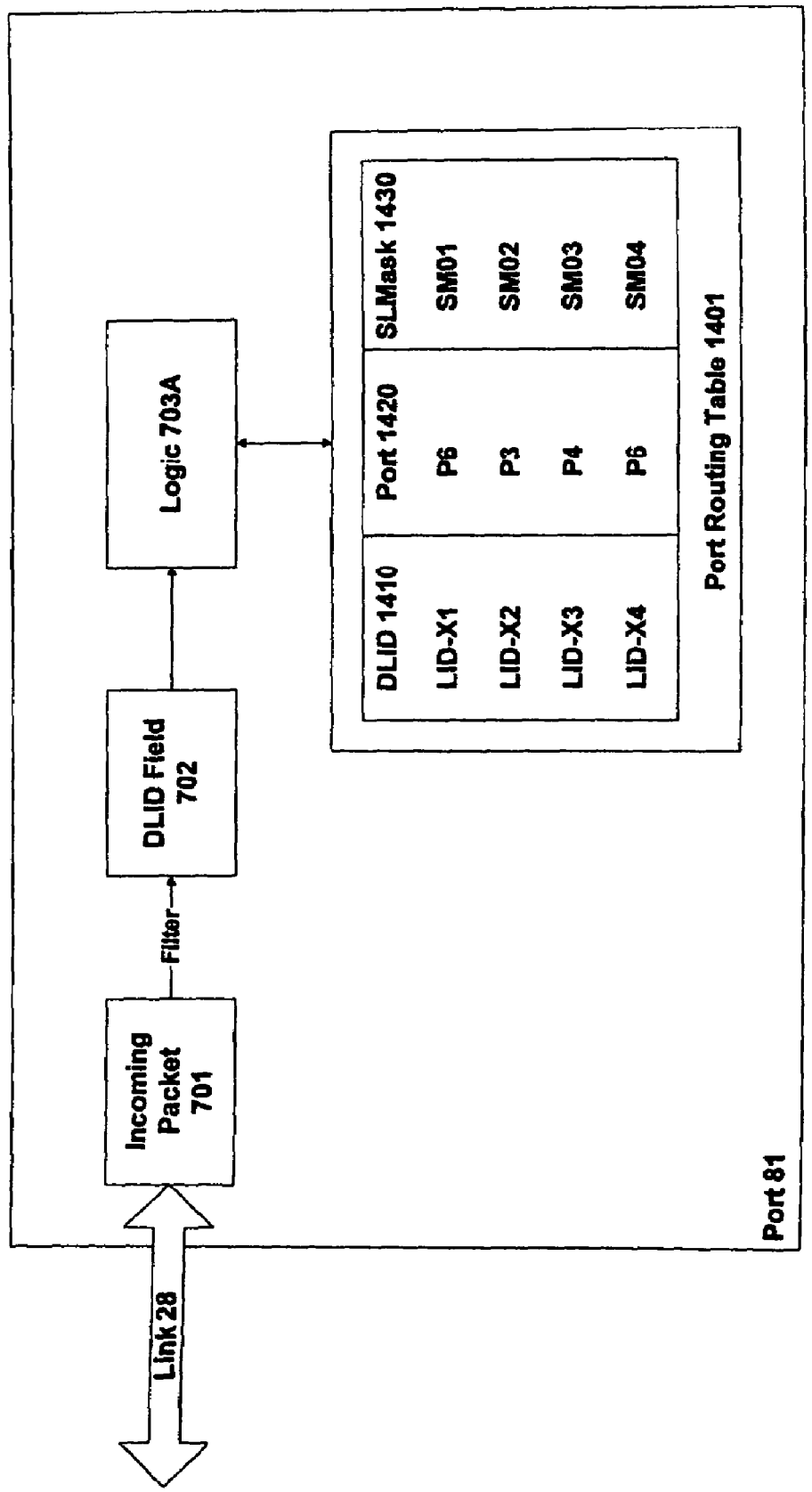
FIG. 14 is a schematic block diagram illustrating a port arranged to check the service level of an incoming packet in accordance with another embodiment of the invention.

FIG. 14 illustrates an alternative embodiment of the invention, in which service level is correlated with the destination LID (DLID) for a packet, rather than with the partition (P_Key). In the embodiment of FIG. 14, each port 81 is provided with its own routing table 1401. The table shown in FIG. 14 has three columns, namely a DLID column 1410, a port column 1420, and a SL Mask column 1430. In the particular embodiment illustrated, the DLID column 1410 contains a set of DLID values (LID-X1, LID-X2, etc), each of which is associated with a corresponding port number (P6, P3, etc), and a corresponding service level (SM01, SM02, etc). For example, a DLID value of LID-X2 is associated with port P3 and mask SM02.

Figure 15:
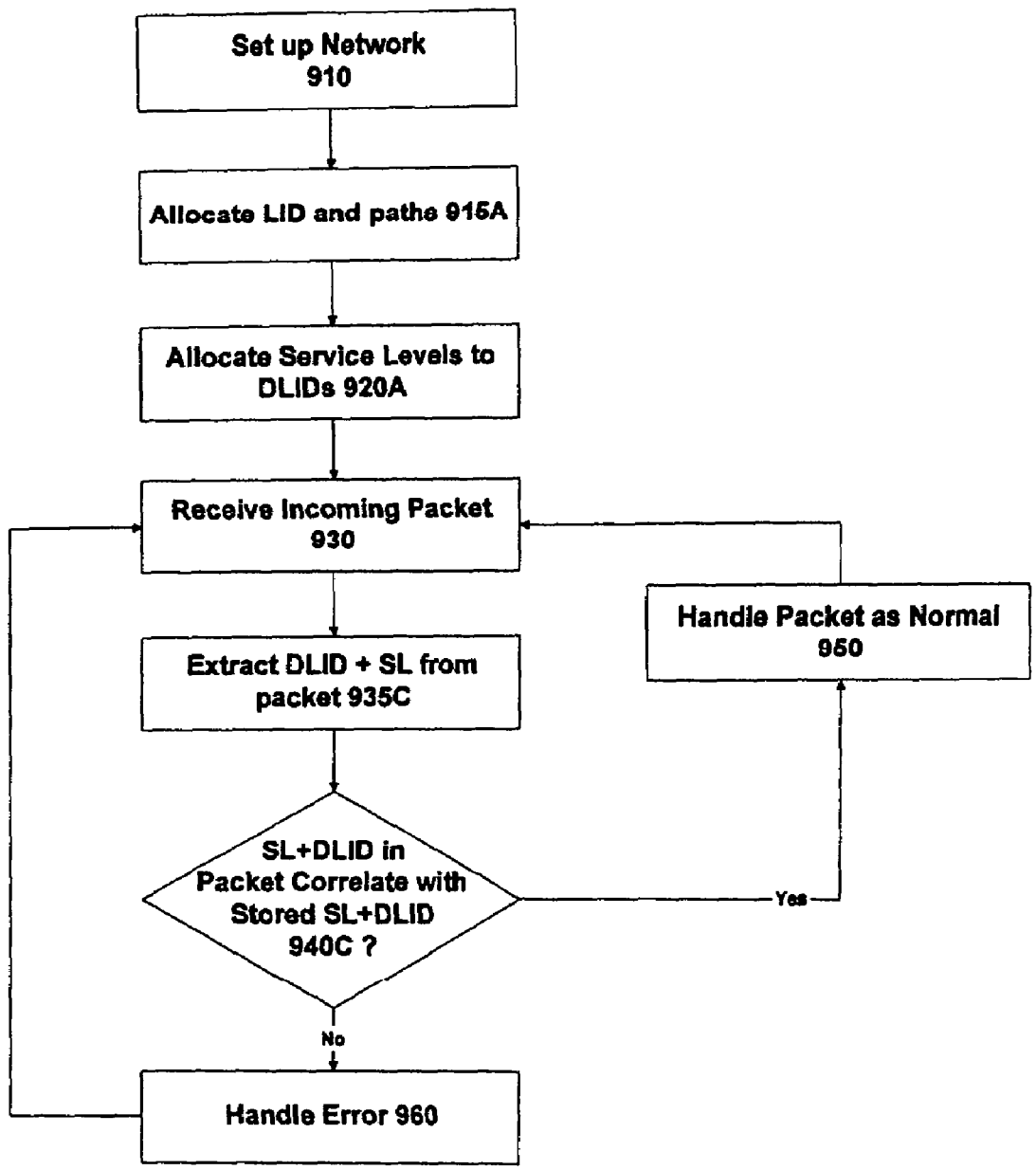
FIG. 15 is a flowchart illustrating a method of checking the service level of an incoming packet for use with the embodiment of FIG. 14 in accordance with one embodiment of the invention.

The operation of the embodiment of FIG. 14 is illustrated in the flowchart of FIG. 15. The method commences with setting up the network (910), as previously described in relation to FIG. 11. As part of the set-up, local identifiers (LIDs) are allocated to the various network nodes, and paths through the network are defined (915A). In the context of the embodiment of FIG. 14, this involves populating the DLID column 1410 and the port column 1420 of routing table 1401. (It will be appreciated that the set-up of paths through the network is already performed as a conventional part of an InfiniBand network, although existing systems have used a node routing table shared between ports rather than individual port routing tables).

The constraints on service levels within the network are now imposed (normally by a subnet manager 34). However, rather than correlating service levels with partitions (as in the approach of FIG. 11), this time the service levels are correlated with DLIDs (920A). In other words, for a given port in the network, packets arriving at that port directed towards a given destination (i.e. having a given DLID value) are specified as limited to one or more service levels (920A). In the embodiment of FIG. 14, this is achieved by populating the SL Mask column 1430 of routing table 1401 with an SL mask value for each DLID specified in routing table 1401. Each SL mask can be represented by a 16-bit value, where each bit corresponds to one of the 16 possible service level values and may be set to a default value, as previously described.

Once the DLIDs in routing table 1401 have been allocated an SL mask, the port receives an incoming packet (930). The DLID value and the SL value are extracted from the packet header (935C). The DLID value is used to index into routing table 1401, thereby allowing a corresponding port and SL mask to be identified. The SL value extracted from the packet header can then be verified against the SL mask appropriate for packets directed towards that DLID (940C). (This verification can be performed, for example, as previously described for the embodiment of FIG. 12). If the verification is successful, the packet contains an SL appropriate to its DLID value, and so can be handled normally (950)—i.e. it can be forwarded to the port corresponding to the DLID value as specified in column 1420. However, if the SL value from the packet is not verified against the relevant SL mask, then the packet is discarded and any appropriate error processing is performed (960).

Although the embodiment of FIG. 14 is based on a per-port routing table, it will be appreciated that correlating SL values with DLIDs could also be performed with a per-node routing table. However, the granularity of control is reduced in this case, since now the SL value cannot be controlled on a per port basis.

Any given network may support SL correlation against partitions and/or DLIDs, depending on the particular circumstances of the network. For example, it may be known that certain end-nodes in the network have a low level of priority (compared to other nodes in the network). In this case, it may be appropriate to restrict packets having a DLID value corresponding to such end-nodes to a low priority SL value. In other circumstances, it may be known that a particular partition in the network should have a low level of priority. Again, it may then be appropriate to restrict packets in this partition to a low priority SL value. Note that some implementations may support SL correlation against both partition and also against DLID. In this case the SL value checks of FIGS. 11 and 15 would both be performed.

In some implementations, it may not be necessary to specify an explicit set of acceptable SL values for every single partition. Rather, if no SL values are specified for a partition, then this might be interpreted as indicating that any SL value is acceptable for that partition. Another possibility is that a set of default allowed SL values is defined as previously discussed, and this set of default SL values is utilised for a partition unless otherwise indicated. Analogous considerations apply with respect to correlating SL values to DLIDs.

One embodiment of the invention described herein is provided as a computer program product, which may comprise program instructions stored on a removable storage medium, for example an optical (CD ROM, DVD, etc), semiconductor (e.g. flash memory) or magnetic (floppy disk, tape, etc) device. Such a medium can then be introduced into a computer system, such as a server, a client, a smart card, a network device (e.g. a switch) etc., in order to transfer the program instructions to the system. Alternatively, the program instructions may be transferred to the computer system by download via a transmission signal medium over a network, for example, a local area network (LAN), the Internet, and so on. The transferred program instructions are often stored on a hard disk or other non-volatile storage of a computer system, and loaded for use into random access memory (RAM) for execution by a system processor.

In conclusion, a variety of particular embodiments have been described in detail herein, but it will be appreciated that this is by way of exemplification only. The skilled person will be aware of many further potential modifications and adaptations that fall within the scope of the claimed invention and its equivalents.

The invention claimed is:

1. A method of handling an incoming packet at a port in a network, the method comprising:
   receiving a packet at the port, wherein said port may belong to multiple partitions, and wherein each of the multiple partitions may have at least one service level associated therewith;
   extracting a partition key from the received packet;
   extracting a service level from the received packet;
   identifying to which of the multiple partitions the received packet belongs using the extracted partition key;
   determining the at least one service level associated with the identified partition; and
   verifying the service level extracted from the packet against the at least one service level associated with the identified partition.

2. The method of claim 1, wherein the extracted partition key is used to access a partition key table to confirm that the received packet belongs to a partition to which the port belongs, and said partition key table is used to identify the at least one service level associated with the partition to which the received packet belongs.

3. The method of claim 2, wherein the partition key table is stored in content addressable memory (CAM), and the method further comprises:
   matching the extracted partition key against an entry for a partition in a partition key table; and
   using the matching entry to locate the associated at least one service level in a separate service level table.

4. The method of claim 1, wherein the at least one service level for the partition is stored as a bit mask.

5. The method of claim 1, wherein said network conforms to the InfiniBand architecture.

6. A communications node for use in a network, the communications node including at least one port comprising:
   an input for receiving a packet at the port, wherein said port may belong to multiple partitions, and wherein each of the multiple partitions may have at least one service level associated therewith; and
   logic operable to:
     extract a partition key from the received packet;
     extract a service level from the received packet;
     identify to which of the multiple partitions the received packet belongs using the extracted partition key;
     determine the at least one service level associated with the identified partition; and
     verify the extracted service level against the at least one service level associated with the identified partition.

7. The communications node of claim 6, wherein said communications node comprises a switch chip.

8. The communications node of claim 6, wherein said identification is performed using a partition key extracted from the received packet.

9. The communications node of claim 8, further comprising a partition key table, wherein the extracted partition key is used to access the partition key table to confirm that the received packet belongs to a partition to which the port belongs, and said partition key table is used to identify the at least one service level associated with the partition to which the received packet belongs.

10. The communications node of claim 9, wherein the partition key table is stored in content addressable memory (CAM), and wherein the extracted partition key is matched against an entry for a partition in a partition key table; and the matching entry is used to locate the associated at least one service level in a separate service level table.

11. The communications node of claim 6, wherein the at least one service level for the partition is stored as a bit mask.

12. The communications node of claim 11, wherein said network conforms to the InfiniBand architecture.

13. A computer program product comprising program instructions that when loaded into a machine cause the machine to perform the method of:

receiving a packet at the port, wherein said port may belong to multiple partitions, and wherein each of the multiple partitions may have at least one service level associated therewith;

extracting a partition key from the received packet;

extracting a service level from the received packet;

identifying to which of the multiple partitions the received packet belongs using the extracted partition key;

determining the at least one service level associated with the identified partition; and verifying the service level extracted from the packet against the at least one service level associated with the identified partition.

* * * * *